(12) United States Patent
Tsai et al.

(10) Patent No.: US 8,845,167 B2
(45) Date of Patent: Sep. 30, 2014

(54) DISPLAY DEVICE

(75) Inventors: Han-Wen Tsai, Hsinchu (TW); Ming-Feng Kuo, Hsinchu (TW)

(73) Assignee: Coretronic Corporation, Hsin-chu (TW)

( * ) Notice: Subject to any disclaimer, the term of this patent is extended or adjusted under 35 U.S.C. 154(b) by 339 days.

(21) Appl. No.: 13/154,750

(22) Filed: Jun. 7, 2011

(65) Prior Publication Data

US 2011/0305036 A1    Dec. 15, 2011

(30) Foreign Application Priority Data

Jun. 14, 2010   (TW) ............................... 99119222 A (51) Int. Cl.
*F21V 7/04*      (2006.01)
*F21V 8/00*      (2006.01)

(52) U.S. Cl.
CPC ............ *G02B 6/0038* (2013.01); *G02B 6/0068* (2013.01)
USPC ...................................... 362/606; 362/249.02

(58) Field of Classification Search
USPC ........................................... 362/606, 249.02
See application file for complete search history.

(56) References Cited

U.S. PATENT DOCUMENTS

| | | | |
|---|---|---|---|
| 7,527,407 B2 * | 5/2009 | Mai ............... | 362/606 |
| 7,580,186 B2 | 8/2009 | Mather et al. | |
| 2007/0008456 A1 * | 1/2007 | Lesage et al. ........... | 349/62 |

FOREIGN PATENT DOCUMENTS

| | | |
|---|---|---|
| JP | 10-039302 | 2/1998 |
| JP | 2002-098960 | 4/2002 |
| JP | 2005-078824 | 3/2005 |
| JP | 2006066282 A | 3/2006 |
| JP | 2007094035 A | 4/2007 |
| JP | 2008-091287 | 4/2008 |
| JP | 2008-262906 | 10/2008 |
| TW | 346546 | 12/1998 |
| TW | 200719058 | 5/2007 |
| TW | M311911 | 5/2007 |
| TW | 200846766 | 12/2008 |
| TW | 200923505 A | 6/2009 |
| TW | 201015128 A | 4/2010 |
| WO | WO-2009157352 A1 | 12/2009 |
| WO | WO-2010047355 A1 | 4/2010 |

OTHER PUBLICATIONS

Official Action issued on Oct. 22, 2013, in corresponding Taiwanese Patent Application No. 10221407170.
Official Action issued on Dec. 31, 2013, in corresponding Taiwanese Patent Application No. 10221797450.

* cited by examiner

*Primary Examiner* — Anh Mai
*Assistant Examiner* — Brenitra M Lee
(74) *Attorney, Agent, or Firm* — Muncy, Geissler, Olds & Lowe, P.C.

(57) ABSTRACT

A display device includes a light guide plate, a first light source device, a second light source device, a display panel, and an image light source synchronization unit. The first and second light source devices are disposed adjacent to two opposite sides of the light guide plate respectively. A plurality of first micro structures are formed on a bottom surface of the light guide plate and capable of deflecting a light beam from the second light source device towards the right-hand side and deflecting a light beam from the first light source device towards the left-hand side. The image light source synchronization unit is capable of displaying the left-side image when the first light source device is turned on and the second light source device is turned off and displaying the right-side image when the first light source device is turned off and the second light source device is turned on.

15 Claims, 10 Drawing Sheets

DISPLAY DEVICE

BACKGROUND OF THE INVENTION a. Field of the Invention

The invention relates to a display device, particularly to a display device having two different viewing angles.

b. Description of the Related Art

Figure 1:
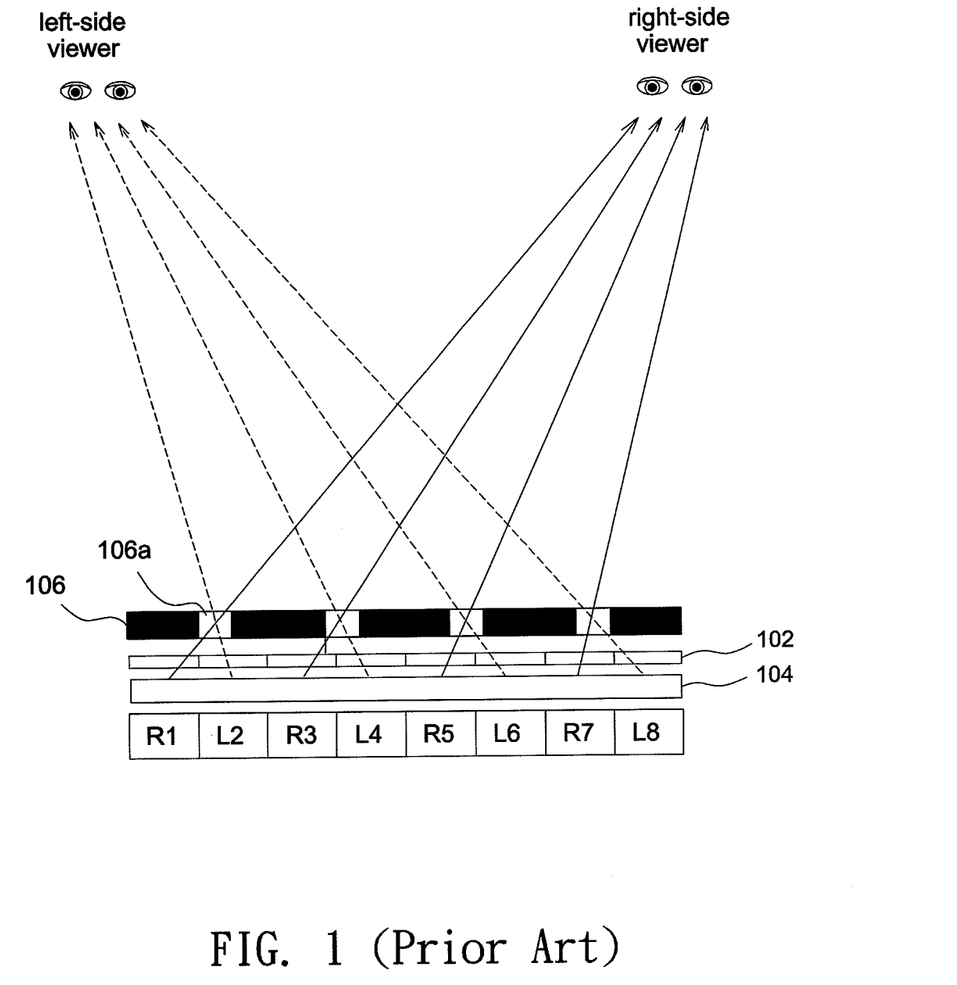
FIG. 1 shows a schematic diagram illustrating a conventional display device having two different viewing angles.

FIG. 1 shows a schematic diagram of a conventional display device having two different viewing angles. The display device may provide two different images respectively for different viewers at the same time because of the different viewing angles. The solid lines in FIG. 1 represent images prepared for a right-side viewer, and the dashed lines represent images prepared for a left-side viewer. As shown in FIG. 1, a display panel 102 serves as an images source, a backlight 104 provides a planar light source emitting light at different directions, and a parallax barrier element 106 is disposed to control the light-emitting direction. By adjusting a width of a light output area 106a of the parallax barrier element 106, a spacing between two adjacent light output areas 106a, and a relative position of the parallax barrier element 106 and the display panel 102, an appropriate light-emitting angle is obtained to allow the right-side viewer to see the images R1, R3, R5, and R7 and the left-side viewer to see the images L2, L4, L6, and L8. That is, two different images are provided for viewers at different positions. However, by such a design, the right-side viewer and the left-side viewer may view an image with half resolution.

Figure 2:
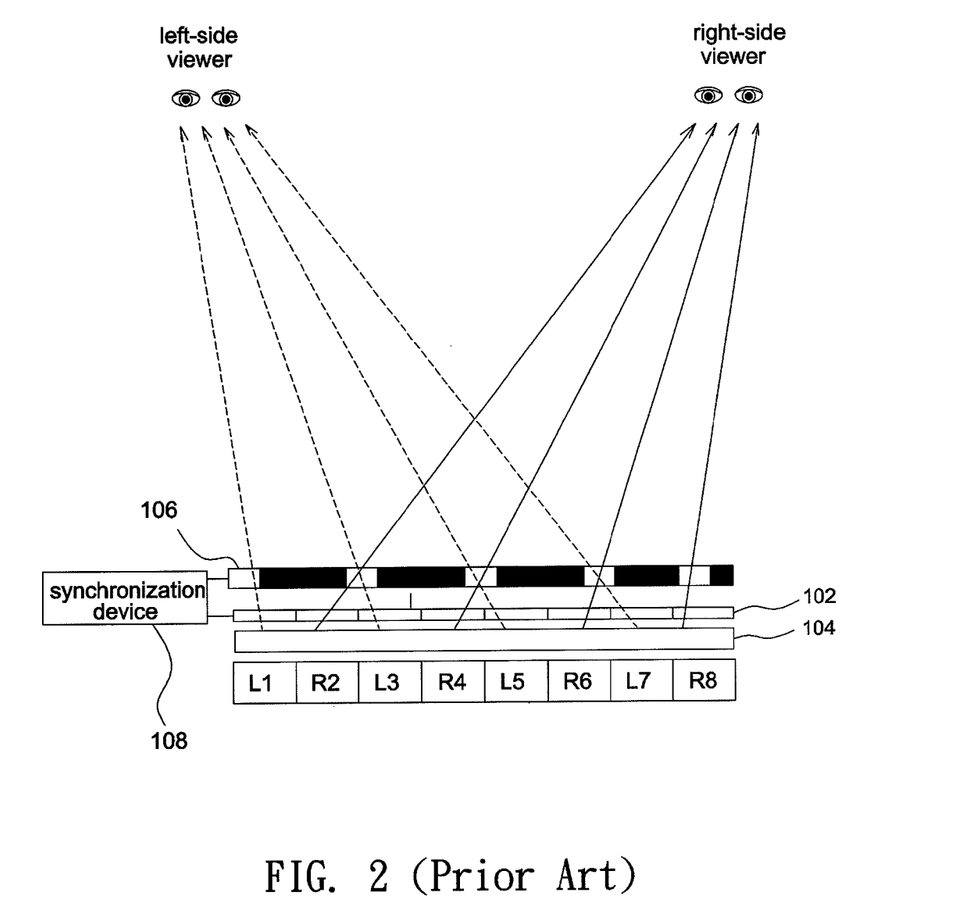
FIG. 2 shows a schematic diagram illustrating another conventional display device having two different viewing angles.

Therefore, another design is proposed to provide a synchronization device 108 capable of performing timing and synchronization controls over the parallax barrier element 106 and the display panel 102. Specifically, at a first time point, the synchronization device 108 simultaneously controls the parallax barrier element 106 and the display panel 102 to allow the right-side viewer to see the images R1, R3, R5, and R7 and the left-side viewer to see the images L2, L4, L6, and L8, as shown in FIG. 1. At a subsequent time point, the synchronization device 108 simultaneously controls the parallax barrier element 106 and the display panel 102 to allow the right-side viewer to see the images R2, R4, R6, and R8 and the left-side viewer to see the images L1, L3, L5, and L7, as shown in FIG. 2. Under the circumstance, because of persistence of vision, the switch of the synchronization device 108 enables the right-side viewer and the left-side viewer to see a full resolution frame (including images R1, R2, R3, R4, R5, R6, R7, and R8 for the right-side viewer or images L1, L2, L3, L4, L5, L6, L7, and L8 for the left-side viewer).

However, the conventional designs use the parallax barrier element 106 to control viewing angles, and such configuration may result in an increase in thickness, weight, and fabrication costs. Further, the parallax barrier element 106 and the display panel 102 need to be aligned precisely to achieve the effect of controlling viewing angles to thereby increase the assembly complexity and decrease the production yield.

BRIEF SUMMARY OF THE INVENTION

The invention provides a display device having two different viewing angles. The display device is capable of simultaneously providing different images respectively for viewers at different positions. Other objects and advantages of the invention may be further illustrated by the technical features broadly embodied and described as follows.

In order to achieve one or a portion of or all of the objects or other objects, an embodiment of the invention provides a display device including a light guide plate, a first light source device, a second light source device, a display panel, a plurality of first micro structures, and an image light source synchronization unit. The light guide plate has a first light incident surface and a second light incident surface opposite to each other, and a bottom surface and a light-emitting surface opposite to each other. The first light source device is disposed adjacent to the first light incident surface, and the second light source device is disposed adjacent to the second light incident surface. The display panel is capable of alternately displaying a left-side image for a viewer on a left-hand side and a right-side image for a viewer on a right-hand side. The first micro structures are arranged on the bottom surface. Each of the first micro structures at least includes a first plane and a second plane. The first plane forms a first angle with respect to the bottom surface and is capable of deflecting a light beam generated by the second light source device towards the right-hand side. The first angle is larger than or equal to 15 degrees and less than or equal to 35 degrees. A second plane forms a second angle with respect to the bottom surface and is capable of deflecting a light beam generated by the first light source device towards the left-hand side. The second angle is larger than or equal to 15 degrees and less than or equal to 35 degrees. The image light source synchronization unit is capable of displaying the left-side image when the first light source device is turned on and the second light source device is turned off and capable of displaying the right-side image when the first light source device is turned off and the second light source device is turned on.

In an embodiment, a longitudinal direction of each of the first micro structures is substantially parallel to the first light incident surface and the second light incident surface.

In an embodiment, a viewing angle of the viewer on the left-hand side is larger than or equal to 15 degrees and less than or equal to 65 degrees, and a viewing angle of the viewer on the right-hand side is larger than or equal to 15 degrees and less than or equal to 65 degrees.

In an embodiment, the display device further includes a plurality of second micro structures formed on the light-emitting surface. A longitudinal direction of each of the second micro structures is substantially perpendicular to a longitudinal direction of each of the first micro structures.

In an embodiment, the first micro structure is a V-shaped groove, and the second micro structure is a V-shaped groove or a lenticular lens.

In an embodiment, when a distance between the viewer on the left-hand side and the viewer on the right-hand side is D, a distance from the viewer on the left-hand side or the viewer on the right-hand side to the display panel is S, the refractive index of the light guide plate is n, and an angle formed between a light-emitting direction of the second light source device towards the first plane and a vertical direction is θ3, the first angle is α and satisfies the following relation:

$$\alpha = [\theta 3 - \sin^{-1}(D/2nS)]/2.$$

In an embodiment, when a distance between the viewer on the left-hand side and the viewer on the right-hand side is D, a distance from the viewer on the left-hand side or the viewer on the right-hand side to the display panel is S, the refractive index of the light guide plate is n, and an angle formed between a light-emitting direction of the first light source device towards the second plane and a vertical direction is θ3, the second angle is β and satisfies the following relation:

$$\beta = [\theta 3 - \sin^{-1}(D/2nS)]/2.$$

In an embodiment, when three adjacent first micro structures of the light guide plate are respectively an $N_{i-1}{}^{th}$ micro structure having a depth $h_{i-1}$, an $N_i^{th}$ micro structure having a depth $h_i$, and an $N_{i+1}^{th}$ micro structure having a depth $h_{i+1}$, a distance between the $N_{i-1}^{th}$ micro structure and the $N_i^{th}$ micro structure is $p_{i-1}$, and a distance between the $N_i^{th}$ micro structure and the $N_{i+1}^{th}$ micro structure is $p_{i+1}$, the first micro structure satisfies the following relation:

$$0.001 \leq h_i/p_i \leq 0.35 \text{ where } p_i = (p_{i-1} + p_{i+1})/2.$$

In an embodiment, the depths of the $N_{i-1}^{th}$ micro structure, the $N_i^{th}$ micro structure, and the $N_{i+1}^{th}$ micro structure are different from each other.

In an embodiment, a depression portion is formed at a tip of the V-shaped groove and indented opposite a pointing direction of the V-shaped groove.

In an embodiment, a depth of the V-shaped groove is h, a width of the depression portion is W, and the first micro structure satisfies the following relation:

$$0 \leq (W/h) \leq 7.5.$$

In summary, the embodiment or embodiments of the invention may have at least one of the following advantages. According to the above embodiments, the parallax barrier element used in a conventional design is omitted while different light-emitting angles as well as the viewing angles are still provided to allow viewers on the left-hand side and the right-hand side to see their respective images. Thereby, a display device having reduced thickness, weight, and fabrication costs is obtained. Further, in a conventional design, a parallax barrier element and a display panel need to be aligned precisely to achieve the effect of controlling viewing angles. In comparison, the above embodiments may not need to perform a precise alignment process because of the omission of the parallax barrier element, and thus the assembly complexity is reduced to increase the production yield.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 3:
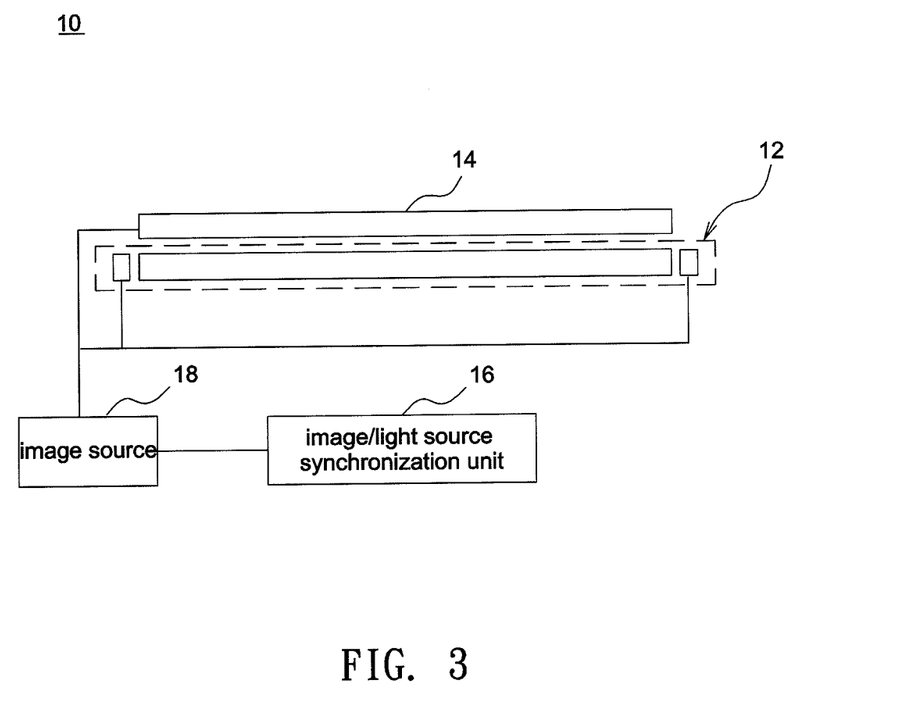
FIG. 3 shows a schematic diagram illustrating a display device according to an embodiment of the invention.
Figure 4:
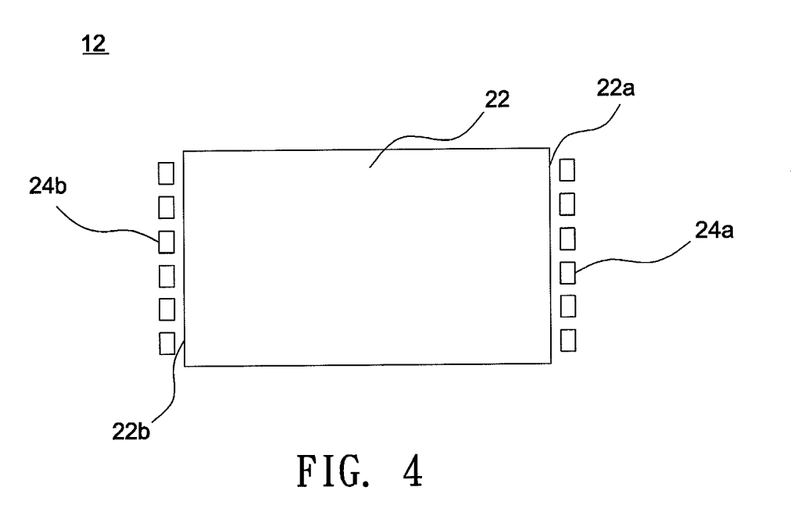
FIG. 4 shows a schematic top-view of a backlight module according to an embodiment of the invention.
Figure 5:
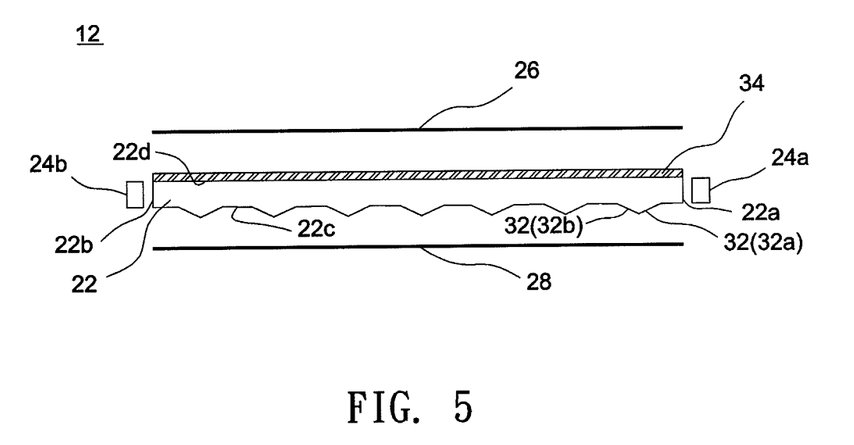
FIG. 5 shows a schematic side-view of the backlight module shown in FIG. 4.
Figure 6:
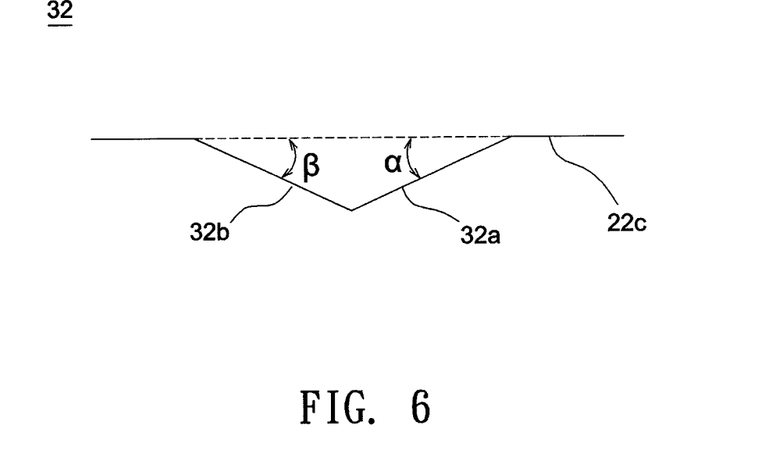
FIG. 6 shows a schematic diagram illustrating a first micro structure according to an embodiment of the invention.

As shown in FIG. 3, a display device 10 according to an embodiment of the invention includes a backlight module 12, a display panel 14, and an image light source synchronization unit 16. Please refer to both FIG. 4 and FIG. 5, the backlight module 12 includes a light guide plate 22, a first light source device 24a, and a second light source device 24b. The light guide plate 22 has a first light incident surface 22a and a second light incident surface 22b opposite to each other, and a bottom surface 22c and a light-emitting surface 22d opposite to each other. The first light source device 24a is disposed adjacent to the first light incident surface 22a, and the second light source device 24b is disposed adjacent to the second light incident surface 22b. Each of the first light source device 24a and the second light source device 24b may include, but not limited to, a light emitting diode (LED) light bar or a cold cathode fluorescent lamp. In this embodiment, the first light source device 24a and the second light source device 24b may be LED light bars; that is, the first light source device 24a and the second light source device 24b are separately provided with a plurality of light emitting diodes. A reflective sheet 28 is disposed adjacent to the bottom surface 22c, and an optical film set 26 is disposed adjacent to the light-emitting surface 22d. The optical film set 26 may include at least one of a brightness enhancement film and a diffusing film. A plurality of first micro structures 32 are formed on the bottom surface 22c, and a longitudinal direction of each of the first micro structures 32 is substantially parallel to the first light incident surface 22a and the second light incident surface 22b. A plurality of second micro structures 34 are formed on the light-emitting surface 22d, and a longitudinal direction of each of the second micro structures 34 is substantially perpendicular to the first light incident surface 22a and the second light incident surface 22b. As shown in FIG. 6, in this embodiment, the first micro structure 32 may be a V-shaped groove, the longitudinal direction of the V-shaped groove is substantially parallel to the first light incident surface 22a and the second light incident surface 22b, and the V-shaped groove at least includes a first plane 32a and a second plane 32b. An angle α is formed between the first plane 32a and the bottom surface 22c of the light guide plate 22, and an angle 13 is formed between the second plane 32b and the bottom surface 22c of the light guide plate 22. When the first light source device 24a is turned on and the second light source device 24b is turned off, the second plane 32b is capable of deflecting a light beam generated by the first light source device 24a towards the left-hand side. Besides, when the first light source device 24a is turned off and the second light source device 24b is turned on, the first plane 32a is capable of deflecting a light beam generated by the second light source device 24b towards the right-hand side. In one embodiment, the angles α and β may be in the ranges of 15°≤α≤35° and 15°≤β≤35°.

Figure 7:
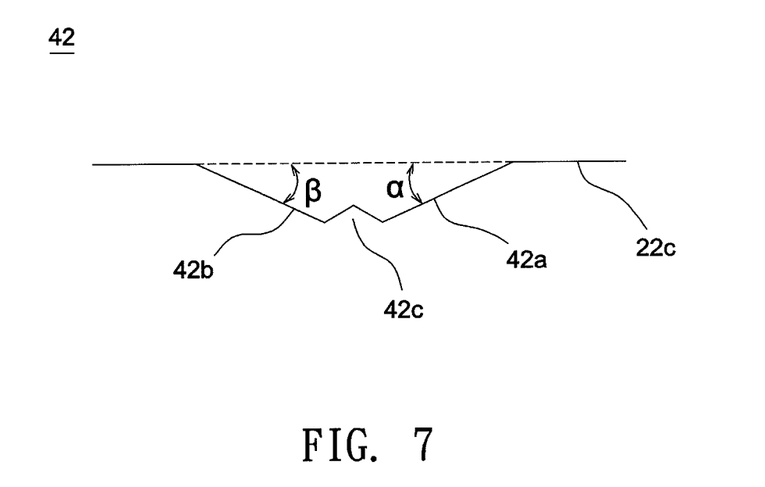
FIG. 7 shows a schematic diagram illustrating a first micro structure according to another embodiment of the invention.

As shown in FIG. 7, in an alternate embodiment, the first micro structure 42 may be a V-shaped groove having a first plane 42a, a second plane 42b, and a depression portion 42c formed at a tip of the V-shaped groove. The depression portion 42c is indented opposite to a pointing direction of the V-shaped groove to substantially form a W-shaped cross-section. Further, in one embodiment, the display panel 14 may be a liquid crystal panel.

Figure 8:
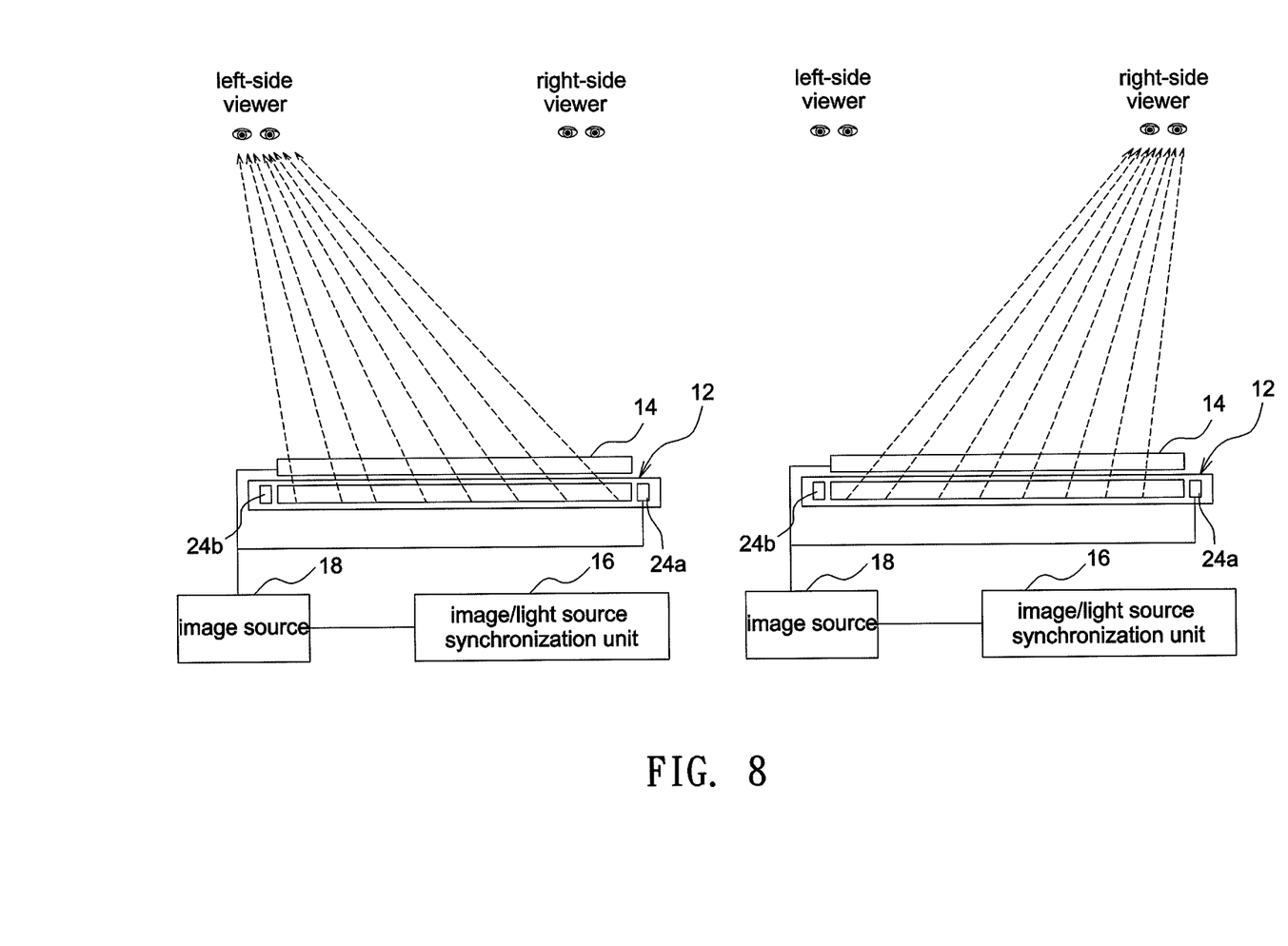
FIG. 8 shows a schematic diagram illustrating operations of a display device according to an embodiment of the invention.

Referring to FIG. 8, at a first time point, the image light source synchronization unit 16 requests the image source 18 to provide an image A, and at the same time turns on the first light source device 24a and turns off the second light source device 24b. Under the circumstance, after light beams are deflected by the first micro structures 32, the image A is seen by a viewer on the left-hand side. Then, at a subsequent time point, the image light source synchronization unit 16 requests the image source 18 to provide an image B, and at the same time turns off the first light source device 24a and turns on the second light source device 24b. Under the circumstance, after the light beams are deflected by the first micro structures 32, the image B is seen by a viewer on the right-hand side. Thus, the display panel 14 continuously and alternately displays the image A and the image B. Because of persistence of vision, the viewer on the left-hand side continually sees the image A, and the viewer on the right-hand side continually sees the image B. Hence, according to the above embodiments, the parallax barrier element used in a conventional design is omitted while different light-emitting angles as well as the viewing angles are still provided to allow viewers on the left-hand side and the right-hand side to see their respective images. Thereby, a display device having reduced thickness, weight, and fabrication costs is obtained. Further, as shown n FIG. 1, the conventional parallax barrier element 106 and the display panel 102 need to be aligned precisely to achieve the effect of controlling viewing angles. In comparison, the above embodiments do not need to perform a precise alignment process because of the omission of the parallax barrier element, and thus the assembly complexity is reduced to increase the production yield.

Figure 9:
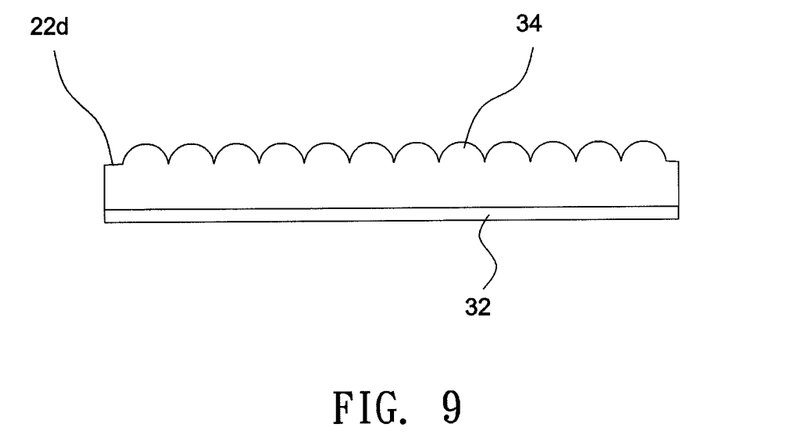
FIG. 9 shows a schematic diagram illustrating a second micro structure according to an embodiment of the invention.
Figure 10:
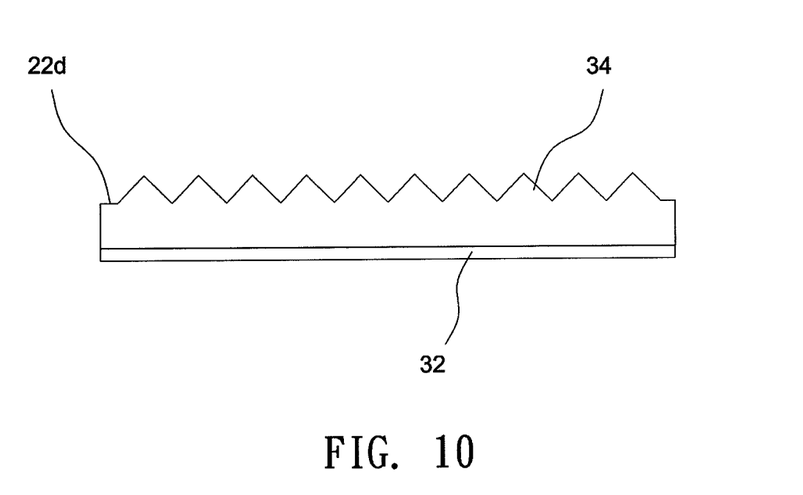
FIG. 10 shows a schematic diagram illustrating a second micro structure according to another embodiment of the invention.

Besides, the longitudinal direction of the second micro structure 34 formed on the light-emitting surface 22d is perpendicular to the longitudinal direction of the first micro structure 32 to enable the light-emitting angle of the light guide plate 22 to be narrowed in both directions, and the both directions are perpendicular to each other. In addition, the profile of the second micro structure 34 is not restricted. For example, the second micro structure 34 may have a cross-section in the shape of a lenticular lens shown in FIG. 9 or a V-shaped groove shown in FIG. 10.

Figure 11:
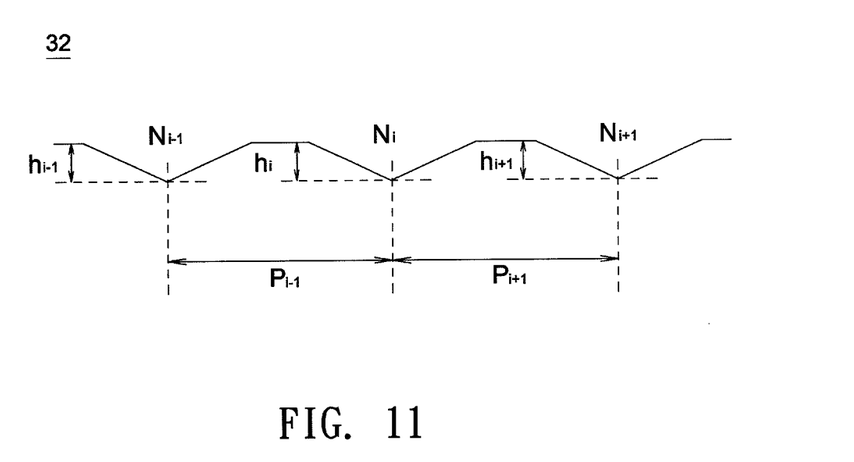
FIG. 11 shows a schematic diagram illustrating an embodiment of dimensions of a first micro structure according to an embodiment of the invention.

As shown in FIG. 11, assumed that three adjacent first micro structures 32 on the light guide plate 22 are respectively numbered as $N_{i-1}$, $N_i$, and $N_{i+1}$ and having depths $h_{i-1}$, $h_i$, and $h_{i+1}$, a distance between the $N_i^{th}$ micro structure and the $N_{i+1}^{th}$ micro structure is $p_{i-1}$, and a distance between the $N_i^{th}$ micro structure and the $N_{i+1}^{th}$ micro structure is $p_{i+1}$. When $p_i$ is defined as $p_i=(p_{i-1}+p_{i+1})/2$, the first micro structure 32, in an embodiment, satisfies the following relation: $0.001 \leq h_i/p_i \leq 0.35$ to further improve the luminous uniformity of the backlight module 12.

Figure 12:
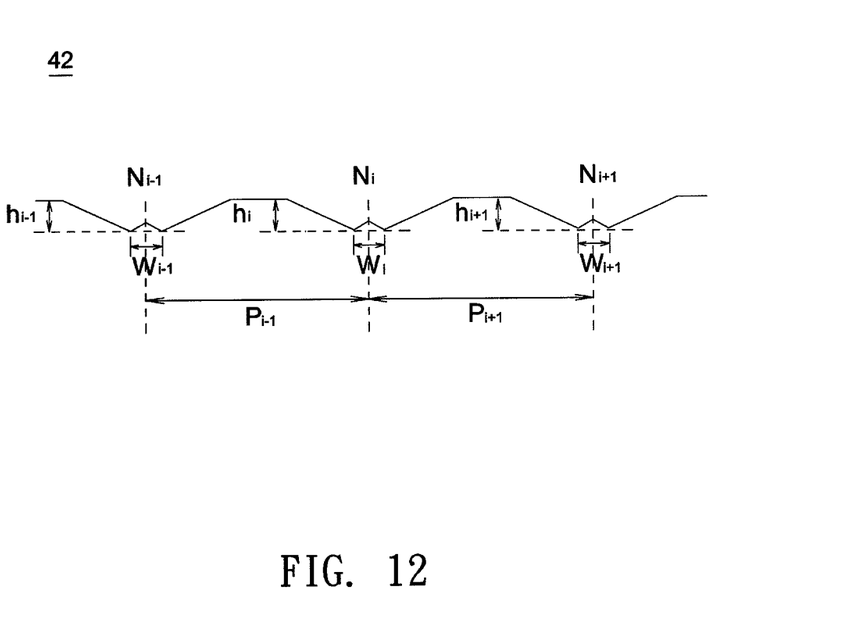
FIG. 12 shows a schematic diagram illustrating an embodiment of dimensions of a first micro structure according to another embodiment of the invention.

As shown in FIG. 12, assumed that three adjacent first micro structures 42 on the light guide plate 22 are respectively numbered as $N_{i-1}$, $N_i$, and $N_{i+1}$ having depths $h_{i-1}$, $h_i$, and $h_{i+1}$, respectively, widths between two tips of each depression portion 42c are $W_{i-1}$, $W_i$ and $W_{i+1}$, respectively, a distance between the $N_{i-1}^{th}$ micro structure and the $N_i^{th}$ micro structure is $p_{i-1}$, and a distance between the $N_i^{th}$ micro structure and the $N_{i+1}^{th}$ micro structure is $p_{i+1}$. When $p_i$ is defined as $p_i=(p_{i-1}+p_{i+1})/2$, the first micro structure 42, in an embodiment, satisfies the following relation: $0.001 \leq h_i/p_i \leq 0.35$ and $0 \leq (W/h) \leq 7.5$ to further improve the luminous uniformity of the backlight module 12. Moreover, in the above embodiments, the depth of each micro structure and the spacing between two adjacent micro structures may be the same or different from each other.

Figure 13:
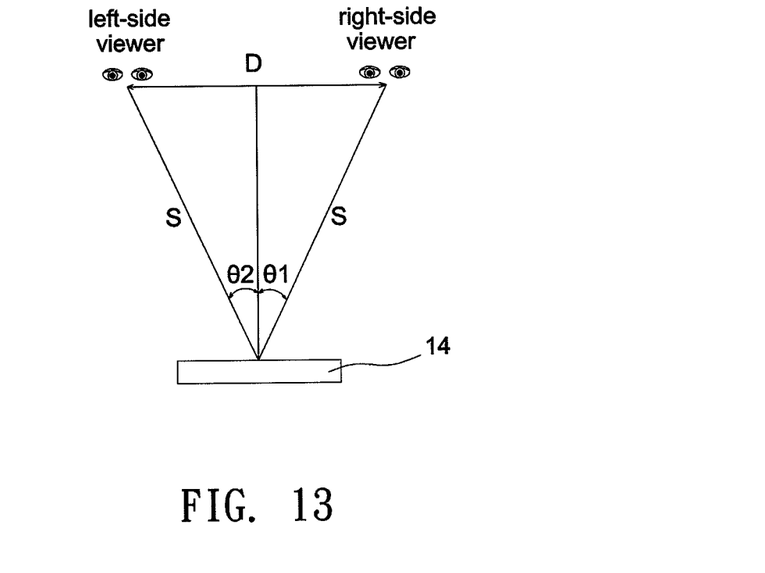
FIG. 13 and FIG. 14 show schematic diagrams illustrating the relationship between the plane inclined angle and the viewing angle of the first micro structure according to an embodiment of the invention.

As shown in FIG. 13, when the distance between the viewer on the left-hand side and the viewer on the right-hand side is D, a distance from the viewer on the left-hand side or the viewer on the right-hand side to the display panel 14 is S, an included angle between a viewing direction from the viewer on right-hand side and the vertical direction is θ1, and an included angle between a viewing direction from the viewer on the left-hand side of the display panel 14 and the vertical direction is θ2, the above parameters satisfy the following relation:

$$\sin(\theta 1)=D/2S \quad (1).$$

Figure 14:
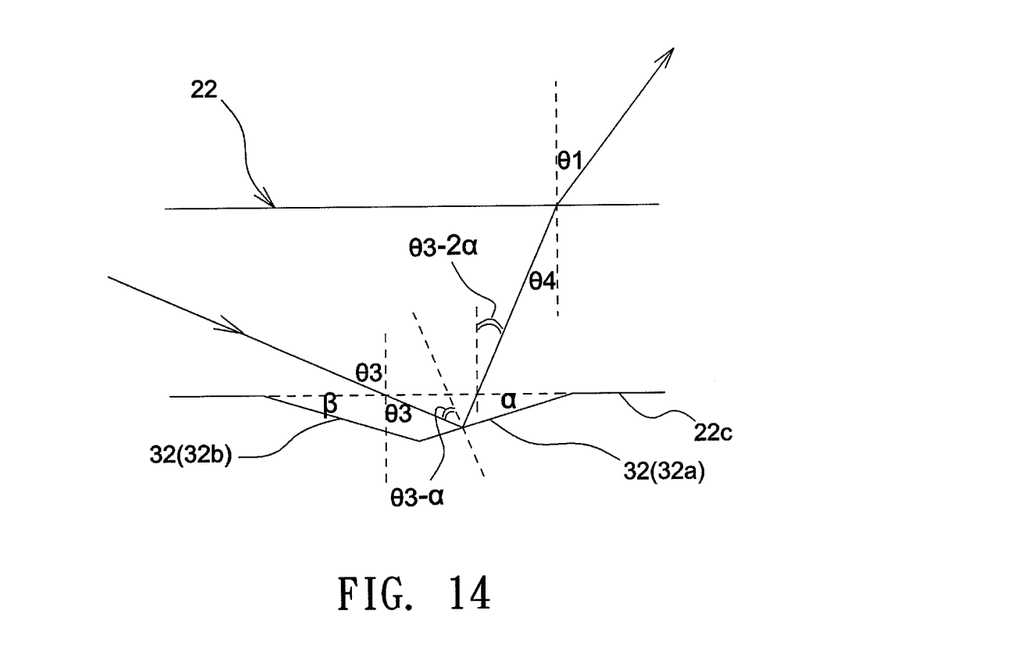

The first plane 32a of the first micro structure 32 forms an angle α with respect to the bottom surface 22c of the light guide plate 22. It is assumed that a refractive index of the light guide plate 22 is n, an included angle between a light-emitting direction of the second light source device 24b towards the first plane 32a and a normal direction of the light-emitting surface 22d is θ3, an included angle between the propagation direction of a light beam totally reflected by the first plane 32a and the perpendicular direction is θ4, and an included angle between the propagation direction of the light beam leaving the light guide plate 22 and the vertical direction is θ1. Then, from FIG. 14 the following relation is derived:

$$\theta 3-2\alpha=\theta 4 \quad (2)$$

$$n\sin(\theta 4)=\sin(\theta 1) \quad (3).$$

From the equations (1), (2), and (3), the following relation is obtained:

$$\alpha=[\theta 3-\sin^{-1}(D/2nS)]/2.$$

Similarly, the second plane 32b of the first micro structure 32 forms an angle β with respect to the bottom surface 22c of the light guide plate 22. When an included angle between a light-emitting direction of the first light source device 24a towards the second plane 32b and the normal direction of the light-emitting surface 22d is θ3, the following relation is obtained:

$$\beta=[\theta 3-\sin^{-1}(D/2nS)]/2.$$

Figure 15:
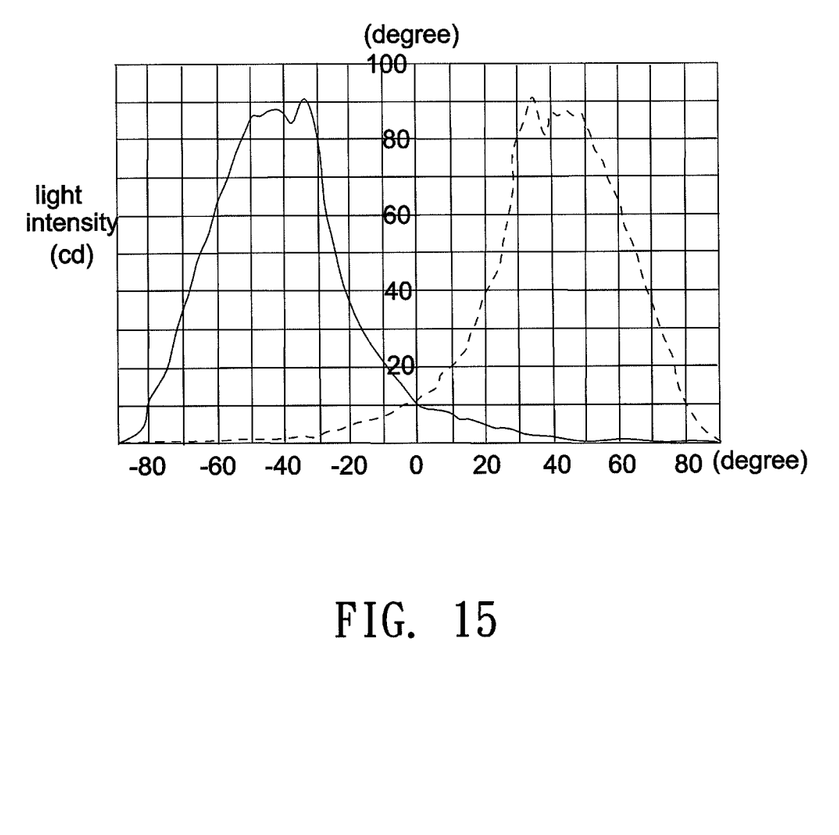
FIG. 15 shows a simulation result of the viewing angle of the display device according to an embodiment of the invention.

Taking a 4.8" display device as an example, when the distance between the viewer on the left-hand side and the viewer on the right-hand side is 150 cm, the distances between the two viewers and the center of a display panel are both 125 cm, and the two viewing angles are symmetric to the normal of the light-emitting surface (θ1=θ2), the required viewing angle of the display device relative to the normal is derived to be ±37°. According to propagating angles of light beams inside the light guide plate, α=β=20° is also derived. FIG. 15 shows a simulation result of the viewing angle of the display device according to an embodiment of the invention. From FIG. 15, when α=β=20°, the light-emitting angles on the two sides of the backlight module are ±37°, where solid lines indicate the light-emitting angle of the first light source device 24a, and dashed lines indicate the light-emitting angle of the second light source device 24b. Besides, in one embodiment, the viewing angle of the viewer on the right-hand side may be in the range of 15°≤θ1≤65°, and the viewing angle of the viewer on the left-hand side may be in the range of 15°≤θ2≤65°. Note that angles θ1 and θ2 may be designed to be equal or not according to the actual demand.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims. Moreover, these claims may refer to use "first", "second", etc. following with noun or element. Such terms should be understood as a nomenclature and should not be construed as giving the limitation on the number of the elements modified by such nomenclature unless specific number has been given.

What is claimed is:

1. A display device, comprising:
   a light guide plate having a first light incident surface and a second light incident surface opposite to each other, and a bottom surface and a light-emitting surface opposite to each other;
   a first light source device disposed adjacent to the first light incident surface;
   a second light source device disposed adjacent to the second light incident surface;
   a display panel capable of alternately displaying a left-side image for a viewer on a left-hand side and a right-side image for a viewer on a right-hand side;
   a plurality of first micro structures arranged on the bottom surface, wherein each of the first micro structures at least comprises:
   a first plane forming a first angle with respect to the bottom surface and being capable of deflecting a light beam generated by the second light source device towards the right-hand side, wherein the first angle is larger than or equal to 15 degrees and less than or equal to 35 degrees; and
   a second plane forming a second angle with respect to the bottom surface and being capable of deflecting a light beam generated by the first light source device towards the left-hand side, wherein the second angle is larger than or equal to 15 degrees and less than or equal to 35 degrees; and
   an image light source synchronization unit capable of displaying the left-side image when the first light source device is turned on and the second light source device is turned off, and capable of displaying the right-side image when the first light source device is turned off and the second light source device is turned on.

2. The display device as claimed in claim 1, wherein a longitudinal direction of each of the first micro structures is substantially parallel to the first light incident surface and the second light incident surface.

3. The display device as claimed in claim 1, wherein a viewing angle of the viewer on the left-hand side is larger than or equal to 15 degrees and less than or equal to 65 degrees, and a viewing angle of the viewer on the right-hand side is larger than or equal to 15 degrees and less than or equal to 65 degrees.

4. The display device as claimed in claim 1, further comprising:
   a plurality of second micro structures arranged on the light-emitting surface, wherein a longitudinal direction of each of the second micro structures is substantially perpendicular to a longitudinal direction of each of the first micro structures.

5. The display device as claimed in claim 4, wherein each of the second micro structures comprises a V-shaped groove or a lenticular lens.

6. The display device as claimed in claim 1, wherein, when a distance between the viewer on the left-hand side and the viewer on the right-hand side is D, a distance from the viewer on the left-hand side or the viewer on the right-hand side to the display panel is S, the refractive index of the light guide plate is n, and an angle formed between a light-emitting direction of the second light source device towards the first plane and a normal direction of the light-emitting surface is θ3, the first angle is α and satisfies the following relation:

$$\alpha=[\theta 3-\sin^{-1}(D/2nS)]/2.$$

7. The display device as claimed in claim 1, wherein, when a distance between the viewer on the left-hand side or the viewer on the right-hand side is D, a distance from the viewer on the left-hand side or the viewer on the right-hand side to the display panel is S, the refractive index of the light guide plate is n, and an angle formed between a light-emitting direction of the first light source device towards the second plane and a normal direction of the light-emitting surface is θ3, the second angle is β and satisfies the following relation:

$$\alpha=[\theta 3-\sin^{-1}(D/2nS)]2.$$

8. The display device as claimed in claim 1, wherein each of the first micro structures comprises a V-shaped groove or a lenticular lens.

9. The display device as claimed in claim 8, wherein three adjacent first micro structures of the light guide plate are an $N_{i-1}^{th}$ micro structure having a depth $h_{i-1}$, an $N_i^{th}$ micro structure having a depth $h_i$, and an $N_{i+1}^{th}$ micro structure having a depth $h_{i+1}$, a distance between the $N_{i-1}^{th}$ micro structure and the $N_i^{th}$ micro structure is $p_{i-1}$, a distance between the $N_i^{th}$ micro structure and the $N_{i+i}^{th}$ micro structure is $p_{i+1}$, and the first micro structure satisfies the following relation:

$$0.001 \leq h_i/p_i \leq 0.35, \text{ where } p_i=(p_{i-1}+p_{i+1})/2.$$

10. The display device as claimed in claim 9, wherein the depths of the $N_{i-1}^{th}$ micro structure, the $N_i^{th}$ micro structure, and the $N_{i+1}^{th}$ micro structure are different from each other.

11. The display device as claimed in claim 8, wherein a depression portion is formed at a tip of the V-shaped groove, and the depression portion is indented opposite to a pointing direction of the V-shaped groove.

12. The display device as claimed in claim 11, wherein a depth of the V-shaped groove is h, a width of the depression portion is W, and the first micro structure satisfies the following relation:

$$0 \leq (W/h) \leq 7.5.$$

13. The display device as claimed in claim 11, wherein three adjacent first micro structures of the light guide plate are an $N_{i-1}^{th}$ micro structure having a depth $h_{i-1}$, an $N_i^{th}$ micro structure having a depth $h_i$, and an $N_{i+1}^{th}$ micro structure having a depth $h_{i+1}$, a distance between the $N_{i-1}^{th}$ micro structure and the $N_i^{th}$ micro structure is $p_{i-1}$, a distance between the $N_i^{th}$ micro structure and the $N_{i+1}^{th}$ micro structure is $p_{i+1}$, and the first micro structure satisfies the following relation:

$$0.001 \leq h_i/p_i \leq 0.35, \text{ where } p_i=(p_{i-1}+p_{i+1})/2.$$

14. The display device as claimed in claim 1, wherein the display panel is a liquid crystal panel.

15. The display device as claimed in claim 1, wherein each of the first light source device and the second light source device is a light emitting diode light bar or a cold cathode fluorescent lamp.

* * * * *